United States Patent [19]

Rowbottom et al.

[11] Patent Number: 4,950,425

[45] Date of Patent: Aug. 21, 1990

[54] METHOD OF DECOMPOSING ALKYL PHOSPHATE

[75] Inventors: Kenneth T. Rowbottom, Warrington; John N. R. Wilkinson, Congleton; Terence M. Conboy, Warrington; Graham V. Hutson, Seascale, all of England

[73] Assignee: Interox Chemicals Limited, London, England

[21] Appl. No.: 350,191

[22] Filed: May 11, 1989

[30] Foreign Application Priority Data

May 18, 1988 [GB] United Kingdom ................. 8811784

[51] Int. Cl.[5] .......................... G21F 9/08; C02F 1/72

[52] U.S. Cl. ...................................... 252/631; 423/10; 210/759

[58] Field of Search .......................... 252/631; 423/10; 210/759

[56] References Cited

U.S. PATENT DOCUMENTS

| | | | |
|---|---|---|---|
| 3,716,566 | 2/1973 | Sansoni et al. | 210/759 |
| 4,294,703 | 10/1981 | Wilms et al. | 210/759 X |
| 4,588,506 | 5/1986 | Raymond et al. | 210/606 |
| 4,624,792 | 11/1986 | Yamanaka et al. | 210/759 |
| 4,729,835 | 3/1988 | McNeillie et al. | 210/759 |

FOREIGN PATENT DOCUMENTS 2192699 2/1986 Japan .

*Primary Examiner*—Edward A. Miller
*Assistant Examiner*—Ngoclan T. Mai
*Attorney, Agent, or Firm*—Larson & Taylor

[57] ABSTRACT

Alkyl phosphates, undiluted or dissolved in hydrophobic solvents can be destroyed in situ by reaction with hydrogen peroxide in the presence of certain transition metal catalyst systems. The invention catalyst system comprises a chromium compound, which dissolves in the aqueous phase, typically an alkali metal chromate, which is employed in conjunction with introduction of an alkali, preferably sodium hydroxide, or in the presence of an alkali buffer to keep the pH of the aqueous phase within a window spanning mildly acidic to mildly alkaline pH during the course of progressive introduction of the hydrogen peroxide, which often lasts from 3 to 10 hours, thereby enabling the oxidation of the alkyl phosphate to continue. The reaction is preferably carried out at a temperature of at least 60° C., and particularly at about 65° to 75° C., or at about the boiling point of the aqueous phase. The window becomes somewhat wider as the reaction temperature increases, the term mildly acidic indicating a pH of at least about pH 6 at around 70° C. to at least pH 5 at around 100° C. Preferably, the solution is maintained at a pH of from 6.5 to 7.5.

34 Claims, No Drawings

METHOD OF DECOMPOSING ALKYL PHOSPHATE

The present invention relates to a process for the destruction of an alkyl phosphate by itself or dissolved in a hydrocarbon solvent.

In the nuclear industry, one of the waste materials produced comprises a radioactive solution of an alkyl phosphate, most usually tributyl phosphate dissolved in a liquid hydrocarbon solvent, normally a kerosene that boils above 100° C., but below about 300° C. Current discharge regulations in some countries prohibit the discharge of free-phase solvent to sea and require that reasonable steps be taken to limit discharges of radiological species. In order to achieve these requirements, it is considered to be necessary for the alkyl phosphate to be destroyed, and the radioactivity transferred into an aqueous phase suitable for feeding to known aqueous effluent treatment plants. By so doing, the resulting hydrocarbon diluent is virtually free from radioactivity and can accordingly be destroyed by incineration, a method that would be much more costly and less convenient, if significant radioactivity is present.

One currently proposed method for the destruction of alkyl phosphates comprises oxidative destruction, for which purpose one type of proposed process employs hydrogen peroxide as oxidant in the presence of a copper or iron catalyst at elevated temperatures, often in excess of 100° C. This type of process is described in for example Japanese patent applications, unexamined publication Nos. 60 061697 and 59 184898 both by Nippon Genshiryoku. Operation at such elevated temperatures is necessary because the destructive capability of the catalyst system becomes increasingly markedly impaired below an acceptable point if a lower operating temperature is employed. Thus, operating temperatures of even 80° C. are unacceptably low. Typical results obtained by the inventors of the instant invention in the course of their background studies showed that at a temperature of about 65° C., excess hydrogen peroxide and either a copper or iron catalyst in the amounts advocated in the art resulted in only around 25% or poorer destruction of the alkyl phosphate from the liquor after 3 hours reaction. It would be of self-evident benefit to locate a catalyst system that was more active than the systems that have been described hitherto as demonstrated by an acceleration of the rate of destruction of the organic phosphate. The Japanese disclosures suggest that their technique destroys also a substantial proportion of their linear hydrocarbon diluent. This is a potential consumer of hydrogen peroxide, possibly even in disproportionate quantities, and accordingly it could be advantageous to employ a process that selectively oxidises the alkyl phosphate without oxidising the bulk of the hydrocarbon diluent.

Accordingly, it is an object of the instant invention to find a catalyst system that is capable of using hydrogen peroxide more effectively than existing systems in the destruction of alkyl phosphates, the extent of effectiveness being measured by either the rate of destruction or the selectivity of destruction and in preferred embodiments employing both criteria. In some embodiments, it is a further object to locate a system that is capable of effective organic phosphate destruction at comparatively low reaction temperatures. In some other embodiments, it is a yet further objective to locate a method of operation which can effectively destroy alkyl phosphates at or near reflux temperature of the reaction mixture whilst maintaining residual hrdyrogen peroxide at a low and safe level.

According to the present invention, there is provided a process for decomposing an alkylphosphate, and particularly tributylphosphate in which the alkyl-phosphate by itself or dissolved in a hydrophobic organic solvent is reacted with hydrogen peroxide in aqueous solution added progressively at a temperature that is above ambient temperature and in the presence of a transition metal catalyst which process is characterised essentially by employing as catalyst an effective amount of a chromium compound and maintaining the aqueous hydrogen peroxide phase at a pH in the window range of mildly acidic, neutral or mildly alkaline by the controlled introduction of alkali at a rate that is sufficient to neutralise the acid released by decomposition of the alkylphosphate, thereby significantly accelerating the rate of decomposition of the alkylphosphate.

It is to be understood that the invention for its effective operation requires simultaneously not only the selection of the appropriate catalyst system, namely a chromium-based system, but also the selection and preservation of appropriate operating conditions and in particular the pH of the aqueous phase of the liquor mixture in which to retain the activity of the catalyst. If either factor is not fulfilled then the benefit of the invention is not properly obtained. However, the employment of both factors together constitutes a key expression of one aspect of the instant invention and enables particularly effective use to be made of the hydrogen peroxide.

In most instances, the invention will be employed in respect of the destruction of trialkyl phosphate compounds, but the technique can be employed in respect of other alkyl phosphates. The invention is particularly suitable for the treatment of alkyl phosphates, be they trialkyl phosphates or otherwise, in which the alkyl groups are in the range of ethyl up to octyl, and is of particular relevance to butyl, which is normally n-butyl. The trialkyl compounds are present normally in a liquid hydrocarbon solvent which is usually a mixture of hydrocarbons obtained, for example, as a cut or fraction during the distillation of petroleum feedstocks. A typical solvent for the trialkyl phosphate is a mixture of hydrocarbons, a kerosene, boiling between 180° and 280° C., but the precise range is very much at the discretion of the user of the up-stream processing process, i.e. the creator of the organic phosphate/kerosene mixture. Other suitable hydrocarbon solvents comprise substantially single component hydrocarbon chosen from hydrocarbons having a boiling point within or similar to the aforementioned temperature range, such as from linear decane up to linear octadecane. One way of taking advantage of the effectiveness of the instant catalyst system is to operate at temperatures below the flash point of the hydrocarbon mixture, thereby in one respect improving operational safety.

Advantageously, experimental data indicates that any and all concentrations of the alkyl phosphate in the hydrocarbon liquor can be treated successfully by the invention process, ranging from compositions in which the hydrocarbon diluent is absent or present in only a small proportion up to compositions which are mainly hydrocarbon diluent and contain very little of the alkyl phosphate, such as 0 to 100 volumes hydrocarbon solvent per volume of alkyl phosphate. In particular, any alkyl phosphate/hydrocarbon composition that is considered suitable for employment in the upstream processing stage can be treated successfully by a process according to the present invention. In many instances, the alkyl phosphate will be undiluted or present in a concentration in the range of 5 to 50% on a volume/volume basis, but of course more dilute solutions are eminently suitable for treatment too.

The invention is applicable to alkyl phosphate solutions in hydrocarbons, and can be carried out effectively on irradiated or non-irradiated solutions. It is therefore of especial practical value as one step in a multi-step process for treating the radioactive wastes produced in the nuclear industry, but may also be applicable outside that industry. The effective destruction of the alkyl phosphate, quantitative destruction having been achieved under the most preferred operating conditions of the instant invention, enables at least the greater proportion of radioactivity to be transferred to an aqueous phase, where it can be successfully treated from the non-aqueous phase where it was a nuisance.

The catalyst system employed in the present invention comprises a chromium compound in which the chromium is present as or is oxidisable in situ to the oxidation state VI. As a result of their experimentation, the inventors have concluded as their working hypothesis that in the course of promoting the destruction of alkyl phosphate, the chromium is oxidised and reduced in a cycle. Hydrogen peroxide reacts, it is postulated, with the reduced chromium species in solution to form either a perchromate or a peroxochromium species which is reduced by reaction with the alkyl phosphate back to the lower oxidation state, probably chromium III. The cycle can continue until either the peroxide is completely consumed or the alkyl phosphate has been totally destroyed. However, it will be understood that the invention itself is not dependent upon the accuracy of that hypothesis, which is offered merely as an explanation for the results achieved.

The chromium compound can be any compound that is soluble to the small extent needed in the liquor, and for convenience will normally be a water-soluble compound. It is particularly convenient to employ an alkali metal chromate, such as potassium or sodium chromate, in that the compound can be expected to be catalytically active straightaway and does not introduce any particularly troublesome additional ionic species. On the other hand, a chromium III compound such as chromic phosphate or hydroxide could be introduced and oxidised in situ.

By the term effective amount of catalyst is meant such an amount that it enables hydrogen peroxide to destroy at least a proportion of the alkyl phosphate. The amount of catalyst present in the liquor does affect to some extent the rate at which the alkyl phosphate is destroyed and the efficiency of utilisation of the hydrogen peroxide. It is convenient to calculate the amount of catalyst employed on the basis of its chromium content alone. It is desirable to employ at least 0.05 parts, preferably at least 0.1 parts of catalyst and particularly preferably at least 0.25 parts of catalyst, the basis being weight/weight chromium in the catalyst per 100 parts alkyl phosphate to be destroyed. Normally, the amount of catalyst will be less than 8 parts per 100 parts alkyl phosphate, and in many practical instances will be selected within the range of 0.25 to 2 parts w/w of catalyst per 100 parts alkyl phosphate. To some extent, though, some effect will be apparent if amounts of catalyst below the desirable amounts are employed, and use of greater than 8 parts catalyst per 100 parts alkyl phosphate is not prohibited.

A key feature of the invention, as has been referred to briefly hereinbefore, is the control of the pH of the aqueous phase. It has been found that there is a window spanning neutral pH, i.e. covering mildly acidic and mildly alkaline pHs at which a chromium catalyst is most effective. The tolerance of the catalyst and hence the breadth of the window, especially on the acidic side, is greater as the operating temperature of the process increases. Thus, the process can tolerate an operating pH of around pH 5 at an operational temperature of or around 100° C. and as the operating temperature employed becomes lower, the minimum operational pH that can be tolerated increases up to about pH 6 at about 60° C. There is a significant improvement in either the extent and/or rate of alkyl phosphate destruction and/or hydrogen peroxide utilisation efficiency as the pH is increased up to an optimum pH which occurs at or just below pH 7. In view of this improvement, it is preferable to employ an operational pH which is at least 0.5 pH units above the minimum operational pH at the reaction temperature selected, such as at least pH 6.5 at 70° C. and at least pH 5.5 at 100° C.

The invention process can tolerate an operational pH of up to about pH 9. There is similarly improvement in alkyl phosphate destruction and/or hydrogen peroxide utilisation efficiency as the pH of the liquor is reduced from higher pHs towards pH 7. Accordingly, it is preferred to maintain the pH at not higher than pH 8, and it is especially advantageous to maintain the pH within the band of pH 6.5 to 7.5, and most preferably to centre pH control in the range of pH 6.5 to 7.0. The meaning of the term "mildly" employed herein with respect to acidic or alkaline conditions will be apparent from the description given herein above.

Destruction of the alkyl phosphate leads to the generation of acidic species, believed to be phosphoric acid which causes the pH of the liquor to drift downwards as the reaction continues. Consequently, it is necessary for alkali to be introduced into the liquor to counteract the increase in acidity. A convenient method for controlling the rate and extent of alkali introduction is based on a simple feedback loop which comprises a pH detector in the body of the liquor in the reaction vessel which is linked to the control valve or control pump which is thereby opened or started when a preset lower pH is reached and closed or stopped when a preset upper limit is reached, the rate of inflow of alkali necessary to increase pH under use conditions having previously been determined. Of course, more sophisticated control mechanisms in which the rate of inflow of alkali is variable or incrementally adjustable and increased as the detected pH falls further away from its desired point are employable and since the control mechanisms are known in themselves, no extra description thereof is required here.

The alkali is most conveniently introduced in the form of an aqueous solution. The alkali can in theory comprise any alkali, but in practice it is preferable to avoid alkalis which would introduce alien anions into solution, so as to minimise a requirement for subsequent extra processing of the liquor treated by the invention process. It has been found to be particularly suitable to use an alkali metal hydroxide solution as the alkali, and sodium hydroxide has the advantage of low cost and widespread availability. Potassium hydroxide is a suitable alternative. As a further alternative, an alkali metal hydrogen phosphate, employed as a pH buffer, can be contemplated successfully, either with or without additional inflow of other alkali. It will also be recognised that for many uses, alkali metal carbonates or bicarbonates are employed as alkalis, with the evolution of carbon dioxide in use. Such materials are employable herein, but at the disadvantage of increasing the amount of off-gasses that must be treated subsequently.

The concentration of the alkali introduced is at the discretion of the process user. Whilst it has been found to be convenient to use a reasonably concentrated solution, preferably of at least molar concentration and particularly when it was desired to minimise the amount of added water to the liquor during the invention treatment, more dilute solutions are readily practicable as well. Indeed, in some embodiments of the invention, there is employed a high ratio of aqueous to organic phases, the ratio being substantially higher than that which would be provided solely from the amount of hydrogen peroxide solution added. In such embodiments, it is convenient for part of the residual aqueous phase, i.e. that present at the end of the destruction period, to be retained and re-employed in a further alkyl phosphate destruction cycle. Some of the residual aqueous phase can be used as solvent for the alkali. By either or both of such measures, the overall consumption of water in the process can be minimised, but still employing a high ratio of aqueous to organic phases in the destruction process.

Although it is a practical proposition to control the pH of the liquor after introduction of hydrogen peroxide commences, it is advantageous also to have adjusted the pH of the liquor to within the desired pH range, and especially to within the preferred pH range, before peroxide introduction commences. For the avoidance of doubt, such a particularly useful process comprises the steps of adjusting the pH of the liquor to the region of mildly acidic pHs, advantageously from about pH 6.5, and preferably from about pH 6.7, up to about 7.0 before any hydrogen peroxide is introduced, and thereafter endeavouring to prevent the pH of the liquor falling much below that range whilst reacting the alkyl phosphate in the liquor with added hydrogen peroxide. Of course, as has been indicated previously herein, a lower pH than 6.5, but one that is still within the range of mildly acidic can be tolerated when the process is operated at a temperature above 70° C., such as at reflux or near reflux temperature conditions, i.e. around or just above 100° C.

It will be fully recognised that if the initial amount of alkyl phosphate is known, and the rest of the conditions are preset, it is possible to obtain good results without an elaborate mechanism for controlling the rate and extent of alkali introduction on the basis of the actual pH detected in the treatment vessel. Instead, the alkali can be introduced at a rate that remains substantially constant relative to the rate of introduction of the peroxide, taking int account the buffering effect of alkali phosphate generated in situ. We have found in practice that this means that the actual alkali requirement for any unit addition of hydrogen peroxide tends to decrease as the total amount of alkali phosphate increases, i.e. as the destruction reaction proceeds. The alkali and hydrogen peroxide rates of introduction can be directly linked, if desired, the actual amount of alkali being determined, for example, in a previous trial. One simple method comprises using two rates of alkali addition. During the early part, e.g. until about a quarter or a third of the alkyl phosphate has been destroyed the higher of the two rates is used, and thereafter the lower rate is used.

It should be emphasised that it is not part of this invention to add at the beginning of the reaction period all of non-buffering alkali like sodium hydroxide that will eventually be needed during the course of the reaction, because the net effect would be that the aqueous phase would have an excessively high alkalinity, with the result that virtually none of the peroxide would be employed productively in destroying the alkyl phosphate and virtually all of it would be consumed wastefully in self-decomposition reactions. However, where the alkali buffers the solution in the desired pH range, as does sodium hydrogen phosphate, all of that type of alkali is preferably added at the start.

It will also be understood that the net effect of introducing an alkali to neutralise the phosphoric acid that is formed from the alkyl phosphate is to in effect generate in situ an alkali phosphate, which can itself act as a pH buffer. Accordingly, it is not always necessary to introduce alkali throughout the entire reaction period, but it can be possible to rely upon alkali phosphate generated during the early part of the reaction period to act as pH buffer during the later part of the reaction period. Naturally, the scope for this saving of alkali is partly dependent upon the operational temperature of the reaction, and hence the tolerance of the catalyst system to the pH of the aqueous phase and the concentration of alkyl phosphate present initially. By way of illustration, it has been found possible to cease alkali introduction after about half of the alkyl phosphate present initially as a concentrated solution in a hydrocarbon solvent has been destroyed at reflux temperature at a pH of about 6.5 to 7.0 and still obtain excellent desruction of the alkyl phosphate.

The hydrogen peroxide is introduced progressively into the liquor, so as to progressively lower the amount of alkyl phosphate remaining therein. For any given initial concentration of alkyl phosphate there appears to be an optimum rate at which the hydrogen peroxide can be introduced, as measured by the efficiency of its destruction of the alkyl phosphate, but even when the rate of introduction differs markedly from the optimum, a very effective process treatment can still be obtained. When considering undiluted or concentrated alkyl phosphate solutions, as typified by concentrations in the region of undiluted down to about 20 to 30% v/v tributyl phosphate in a hydrocarbon solvent such as kerosene, it is desirable to introduce the hydrogen peroxide over a period of at least 1 hour and preferably over a period of at least 3 hours. An optimum addition period for such solutions is often from 4 to 6 hours, but slower addition rates also yield success. Thus, periods of, for example over 6 hours up to 10 hours or even longer can be contemplated, but are often not necessary in view of the excellent results obtained in the shorter addition periods of up to 6 hours. To some extent at least, the use of the longer periods of introduction of a unit amount of hydrogen peroxide tends to result in its more efficient utilisation, and therefore a practical balance is struck in many instances between the added costs of reduced throughput and the cost savings arising from lowered peroxide usage.

The choice of a reaction period of at least 3 hours assumes that the intention of the process user is to eliminate to a substantial extent, say over 95% and preferably substantially quantitatively, by which we mean herein about 99% or more of the alkyl phosphate from the liquor. Where it is desired to remove only a smaller proportion of the alkyl phosphate, a correspondingly smaller amount of hydrogen peroxide is added during a correspondingly shorter addition period, i.e. the rate of addition of the peroxide can remain substantially the same. It will also be understood that if the combination of conditions selected has not enabled the residual amount of alkyl phosphate to be reduced to the desired level, which level is often about 1% or less of the initial amount, peroxide addition can be continued proportionately longer to increase the amount of peroxide added and improve the extent of alkyl phosphate destruction. However, when substantially quantitative destruction of the alkyl phosphate has been achieved, there is no need to add extra peroxide.

During the course of conducting the experimental trials described hereinafter, it was observed that the progressive addition of hydrogen peroxide to the reaction mixture under preferred operating conditions not only resulted in an excellent rate and extent of destruction of the alkyl phosphate, but that during the reaction period the concentration of hydrogen peroxide in the aqueous phase remained low and varied only a little. This observation forms the basis for a suitable technique for controlling the rate of introduction of the hydrogen peroxide solution, namely to monitor the residual hydrogen peroxide concentration in the aqueous phase during the reaction period and based on the monitoring, introduce the hydrogen peroxide at a rate so controlled that its concentration in the aqueous phase is maintained at an acceptably low level. It is convenient to set the upper limit in such operating mode in the region of about 1.0% w/w hydrogen peroxide. If a wet analytical technique is employed which comprises extracting a liquid sample, allowing phase separation and then carrying out a standard iodide titration to determine the hydrogen peroxide concentration, it will recognised that there is a significant period between first taking the sample and obtaining the reading during which some of the peroxide will decompose. Thus, it is desirable to so adjust the rate of peroxide addition that the wet technique reading is not more than about 0.5% w/w hydrogen peroxide, and in many operational embodiments, the concentration can be allowed to fluctuate about an average value in the range of 0.1 to 0.2% w/w hydrogen peroxide.

It will be recognised that such a monitoring method removes the need to decide beforehand as to the total length of time and the total amount of hydrogen peroxide to introduce in order to attain a preselected extent of destruction of the alkyl phosphate. However, in practice, both the period of introduction and the total amount introduced which arise as a result of using this technique fall within the ranges described herein for those parameters. This may also be used as a test method on a trial sample to establish peroxide introduction rate, period of introduction and total amount in a subsequent full scale process under substantially the same operating conditions, and particularly pH, temperature, nature of alkyl phosphate, hydrocarbon diluent, if present, and catalyst level. Advantageously, by ensuring that the concentration of hydrogen peroxide in the reaction mixture is kept at a low level, safe operation of the invention process is promoted.

The total amount of hydrogen peroxide to effect substantially complete destruction of the alkyl phosphate varies to some extent according to the other process conditions, which conditions include the temperature of operation and the pH of the aqueous liquor. Such actual amount is a measure of the efficiency with which the hydrogen peroxide is used, a concept to which reference has been made previously herein. In practice, it is most convenient to continue to add the hydrogen peroxide at a suitable rate, which may be substantially constant or equivalent thereto or may be otherwise controlled in accordance with the teachings herein, until the desired extent of destruction of the alkyl phosphate has occurred. Such a method of addition is an alternative to that of introducing a preset ratio of peroxide to alkyl phosphate or may be used as the basis for determining the size of the preset ratio that can be employed in a subsequent run under similar operating conditions, possibly with the addition of a small margin, e.g. 5% to allow for minor process variations. Both methods can be employed in the present invention. The mole ratio of hydrogen peroxide:alkyl phosphate added is usually in the range of from 35 to 350 moles of hydrogen peroxide per mole of alkyl phosphate that it is present, whether it is added until a preselected proportion of the alkyl phosphate has been destroyed or the preselected ratio is added.

By selecting process conditions that are at or near the most preferred ranges, and particularly employing an operating temperature of at least 60° C. and controlling the pH of the liquor in the preferred window range of about pH 6.5 to pH 7 at up to about 75° C. widening to include pH 5.5 at 100° C. or thereabouts, it is possible to obtain substantially quantitative destruction of the alkyl phosphate without needing to exceed a total peroxide addition of 150 moles per mole of alkyl phosphate. Indeed, the minimum ratio to achieve substantially quantitative alkyl phosphate destruction under preferred operating conditions can be found in the range of 60 to 150 moles hydrogen peroxide per mole alkyl phosphate at operating temperatures of up to about 70° C. and in the range of about 50 to 100 moles per mole alkyl phosphate at temperatures in excess of 70° C., such as at or near reflux temperature, the actual minimum ratio varying inversely with the operating temperature employed. If proportionately lower than quantitative alkyl phosphate destruction is desired, then proportionately lower amounts of peroxide may be employed.

Trials were carried out in which the hydrocarbon solvent alone, i.e. free from alkyl phosphate, was contacted with aqueous hydrogen peroxide and invention catalyst under the invention conditions in order to determine the extent to which the peroxide was oxidising the solvent. The trials measured the amount of carbon dioxide that was formed rather than the amount of solvent which was lost, because solvent can be lost by physical means in addition to chemical oxidation. It was found in a series of trials that only a very small fraction of the hydrocarbon was oxidised in the course of the trials, ranging from about 0.5 to 3%. This indicates clearly that the oxidation system of the instant invention is highly selective towards oxidising the alkyl phosphate.

The concentration of hydrogen peroxide in the solution that is introduced appears to have little effect upon the efficiency with which it destroys the alkyl phosphate, at least at a concentration above 10% w/w in water. Thus, when it is desired to minimise the volume of aqueous liquor remaining at the end of the process and/or minimise the amount of aqueous liquor for subsequent disposal, it is preferable to employ as concentrated a solution of peroxide as possible that is commensurate with at all times monitoring the remaining components of the composition formed and ensuring that the liquid phase does not comprise a hazardous composition. The dilution of the composition with water obtained as a byproduct from hydrogen peroxide means that the possibility of the liquid phase being hazardous diminishes as the reaction proceeds. Hazard reduction can also be effected by the preintroduction into the reaction mixture of an aqueous phase, such as an equivolume amount of water or even greater. In practice, the peroxide solution introduced has a concentration often chosen in the range of 25 to 65% w/w, and particularly up to 55% w/w, but of course its concentration in situ is much lower.

During the course of the reaction, a substantial volume of hydrogen peroxide solution is introduced relative to the initial volume of the reaction mixture. However, some of the mixture, primarily water, will be evaporated from the mixture because the reaction is being conducted at an elevated temperature, the actual amount being greater at the higher reaction temperatures. The evaporated water can subsequently be condensed. The condensate can be restored wholly or partly to the reaction mixture, if desired in order to ensure that there is a suitable volume of aqueous phase present therein, or can simply be passed to a further purification stage if desired. In practice, there is usually a net removal of water from the reaction mixture. It has been found that it is possible in some highly desirable embodiments to operate the invention process with a substantially constant volume of reaction mixture, by matching the rate of introduction of aqueous hydrogen peroxide solution with the net rate of removal of water by evaporation. In constant volume embodiments, it is most desirable to employ the feature of premixing the organic phase with an aqueous diluent phase so that the weight ratio of aqueous to organic phases is at least 1:1 and often within the range of 1.5:1 to 5:1. By employing such an amount of aqueous phase, it is possible to combine the engineering benefits of a constant volume reactor with the benefits accruing from only a low concentration of hydrogen peroxide in the reaction mixture at any time. The constant volume reactor is most espcially suitable for operation at or within 5° C. of the reaction mixture reflux temperature. Other parameters, such as pH, peroxide concentration and catalyst amount, may be selected in accordance with the description of that parameter herein in substantially the same way as for other embodiments of the invention in which the reaction volume increases during the reaction period.

The invention is described herein in the context of separate additions of hydrogen peroxide and alkali. It will be fully understood that the aqueous stream introduced into the treatment vessel can comprise simply an aqueous alkaline solution of hydrogen peroxide containing the appropriate ratio of alkali and peroxide. To avoid premature peroxide decomposition, such a stream is preferably prepared just prior to its introduction and use. It will also be recognised that if the user so chooses, all or part of the added alkali can itself be a source of peroxide as well as alkali, for example sodium peroxide or sodium percarbonate, although the latter would introduce an extra source of carbon dioxide generation. The user is accordingly adding in effect hydrogen peroxide that is released in situ and for the avoidance of doubt this amount is taken into full equimolar account when the user calculates how much hydrogen peroxide he is adding. Reference to the amount and rate of hydrogen peroxide herein is deemed to include a reference to embodiments in which a proportion is added as an alkali peroxide. It is in practice often a matter of relative cost of the materials as to which alkali and peroxide to choose.

The temperature at which the process is carried out is at the discretion of the user, normally taking into account in practice three factors. These factors are first that the rate of destruction of the alkyl phosphate and the capability of heat removal increases as the temperature increases; likewise in the second factor, the efficiency of utilisation of the peroxide for alkyl phosphate destruction increases as the temperature increases in the range of temperatures tested, but in the third factor process design constraints may be more stringent in order to ensure safe operation of the process, if the operating temperature exceeds the flash point of the solvent, i.e. the organic phase. Clearly the extent of any difficulties or constraints imposed thereby is a function of the solvent at least in theory, but as a practical matter, the real scope for selecting solvents with higher flash points is limited due to the concomitant properties of such other solvents. The extent of constraint is naturally modified also by the presence of the other constituents in the reaction mixture during the destruction process, and in particular the presence of dissolved alkyl phosphate and a substantial aqueous phase.

Whilst the reaction can be allowed to proceed at a temperature as low as 30° C., it is preferable to employ a temperature of at least 50° C. and especially preferable one of at least 60° C.

It is a direct benefit of the improved efficiency of the present invention that the user is able to obtain substantially complete destruction of the alkyl phosphate without exceding 75° C., and indeed, in one currently preferred set of embodiments, the operating temperature range is from 65° to 75° C., thereby enjoying the benefit of operating below the flashpoint temperature of the hydrocarbon solvent.

Naturally, it will be understood that if the user wishes, he may operate at a temperature above 75° C., for example up to the boiling point of the aqueous phase which is often in the region of about 100° to 105° C., depending upon the concentration of solutes therein. In that more elevated temperature range, the invention catalyst system remains very effective and the process gains the benefit of an improved capability for cooling the exothermic alkyl phosphate destruction/ hydrogen peroxide decomposition reactions, especially when water is allowed to boil off from the liquor. In addition, and in accordance with other disclosures given hereinbefore, two further practical benefits are available at reflux or near reflux temperature operation. The tolerance of the catalyst to acidic conditions is greater so that a pH operating window for the aqueous phase is widened down to about pH 5, and the consumption of hydrogen peroxide per unit amount of alkyl phosphate destroyed is reduced. Thus, in a second set of preferred operating conditions, the invention process is conducted at such a temperature that water boils off from the aqueous phase during the alkyl phosphate destruction period, i.e. at reflux temperature.

A further practical benefit accrues from operating the invention process compared with operating prior art hydrogen peroxide processes employing iron or copper salts as catalysts. The improved efficiency of the instant invention process means that less peroxide needs to introduced into the reaction mixture, because less is wastefully lost in exothermic decomposition reactions. Thus, in the instant invention, the amount of heat removal per unit amount of alkyl phosphate destroyed is proportionately less than in the prior art processes and the enhanced reactivity of the invention catalyst system reduces the likelihood of undesirably high concentrations of hydrogen peroxide building up in the reaction mixture at some time during the reaction period. As a consequence, the instant invention is a safer process to operate.

It will be recognised that there are two liquid phases in the treatment vessel during the course of the treatment process. Efficient stirring of the liquids is extremely beneficial so as to ensure a high contact surface area between the phases and thereby promote transfer of alkyl phosphate into direct contact with the catalyst system and peroxide for its destruction.

As a result of substantially complete destruction of the alkyl phosphate, the alkyl moiety is converted to gaseous carbon dioxide and water and the alkyl phosphate to phosphoric acid, it is believed. The phosphoric acid, is in fact neutralised in the course of pH control, and can subsequently be removed from the hydrocarbon solvent in the aqueous phase. A very substantial fraction of radioactivity transfers to the aqueous phase in the course of the invention process. The hydrocarbon phase has consequently lost most or virtually all of its radioactivity and can be destroyed by incineration after separation from the aqueous phase. Thus, the invention process attains the objective of enabling the waste hydrocarbon to be treated to destruction without releasing substantial amounts of radioacivity to the atmosphere.

Having described the invention in general terms, specific embodiments thereof will be described hereinafter in greater detail by way of example only.

In all the Examples and Comparisons, the apparatus and general method employed was as described below, except and in so far as is specifically mentioned subsequently herein.

The apparatus comprised a 1 liter round-bottomed glass flask, equipped with a 4 port top. Three of the ports were fitted with respectively a glass-calomel pH electrode probe, a temperature probe and a stirrer. The fourth port was vented to a gas collector through a water-cooled condenser with a gas sample port and was provided also with an inlet line for hydrogen peroxide and an inlet line for sodium hydroxide each attached to its own peristaltic pump. The flask was suspended in a heated water bath.

The off-gas was passed through a liquid trap (Dreschel bottle) and collected by water displacement from a 250 ml inverted measuring cylinder suspended over a water trough. The rate of gas evolution was obtained by measuring the gas collected in a set time.

The general method employed consisted of first introducing into the flask a predetermined amount of the organic liquor, normally a solution of tributyl phosphate (abbreviated to TBP) in odourless kerosene (abbreviated to OK). In liquor was 40.26 g of a 27% w/w solution, and in subsequent Examples and Comparisons the liquor was a 27% v/v solution. Next, 100 ml of water, optionally containing the selected catalyst was mixed with the kerosene solution. If no catalyst were present already, it was then added. The mixture was stirred and warmed to reaction temperature, normally 65° to 70° C., and the desired amount of aqueous hydrogen peroxide solution was added at an approximately constant rate over the specified time period. In Comparisons CA to CI and Examples 1 to 16, its concentration was about 27% w/w and in the subsequent Examples and Comparisons its concentration was about 50% except where stated differently. Initially, the mixture had a measured pH of about pH 8.5. In all of the Examples except for Ex 16, a non-buffering alkali was introduced during the reaction period to maintain approximately the specified pH, and during the course of the reaction period a buffering alkali formed in situ. In Ex 16, a buffering alkali was added before the peroxide was introduced. In the Comparisons no pH control was exercised. Periodically, small samples of the organic phase in the mixture were extracted and analysed for residual tributyl phosphate by a standard gas chromatographic technique using dimethyl phthalate as internal standard, in a Pye-Unicam gas chromatograph (OV 25 column and flame ionisation detector) in conjunction with a Spectra-Physics SP4270 Integrator and printer.

The off-gas was analysed for oxygen content using an ANACHEM (Trade Mark) analyser and for carbon dioxide content using a Perkin-Elmer 983G spectrophotometer.

COMPARISONS CA TO CI AND EXAMPLE 1

CATALYST SYSTEM

Comparisons CA to CI do not exemplify the instant invention, but instead show the background against which the results of Example 1 can be judged. In each of the Comparison trials, the hydrogen peroxide solution, 660 g of a 27% w/w aqueous solution, was added over a period of 3 hours and no attempt was made to control any pH drift of the mixture. In Example 1, the process of Comparison CI was followed, but the pH of the mixture was maintained after the first few minutes at about pH 7.0 by the introduction progressively of sodium hydroxide solution(2M) as needed and under the control of the pH probe. The type and amount of the catalysts employed and the results obtained are summarised in Table 1 below.

TABLE 1

| Comparison | Catalyst Type | Amount (g) | Final TBP Conc n % | % TBP Destroyed |
|---|---|---|---|---|
| CA | $Fe(NO_3)_3.9H_2O$ | 0.60 | 20.0 | 26 |
| CB | $Cu(NO_3)_2.3H_2O$ | 0.50 | 21.0 | 22 |
| CC | $NaVO_3.H_2O$ | 0.25 | 25.5 | 6 |
| CD | $Co(NO_3)_2.6H_2O$ | 0.60 | 25.0 | 7 |
| CE | $Na_2(WO_4).2H_2O$ | 0.66 | 27.3 | 0 |
| CF | $Na_2MoO_4.2H_2O$ | 0.50 | 26.9 | 0 |
| CG | $RuO_2.2H_2O$ | 0.35 | 27.0 | 0 |
| CH | $KMnO_4{}^+$ | 0.32 | 27.0 | 0 |
| CI | $K_2CrO_4$ | 0.42 | 18.2 | 32 |
| Example | | | | |
| Ex 1 | $K_2CrO_4$ | 0.42 | 0.4 | 99 |

In addition, Comparisons CE and CF were twice repeated whilst controlling the pH of the mixture at respectively pH 6 or 8. In none of the repeats was there any significant TBP destruction, indicating that the tungsten or molybdenum catalyst was not made more effective by pH control.

From Table 1, it can be seen that at about 70° C. reaction temperature, a suitable temperature for ranking the effectiveness of the catalyst systems, the extent of TBP destruction using the prior art catalyst iron and copper systems was extremely poor in Comparisons CA and CB. Secondly, it will be seen that various other transition metals that have been described as catalysts for use with hydrogen peroxide, namely vanadium, cobalt and manganese were very ineffective for the present purpose, as shown by Comparisons CC, CD and CH. A less commonly described catalyst, ruthenium, was shown in Comparison CG to be ineffective. Thirdly, it will also be seen from Comparison CI that a system based on chromium was also extremely poor unless, as in Example 1, the pH of the liquor was appropriately controlled. Fourthly, it will be seen that the chromium catalyst is different from the other two members of the Group VIa of the Periodic Table, namely molybdenum and tungsten which would have been expected to have performed somewhat similarly. Not only were the latter two transition metals ineffective for the particular purpose of destroying alkyl phosphates without pH control, but they remained so even with pH control.

Thus, the results highlighted in Table 1 demonstrate clearly the specialist requirements of the instant invention, and show that it is not possible to predict from prior art disclosures of a general nature or directed to the catalysed oxidation of other compounds differing from alkyl phosphates that the method of the instant invention would be so successful.

EXAMPLES 2 TO 4

EFFECT OF TEMPERATURE

In these Examples, the method of Example 1 was followed, except that the temperature of reaction was controlled to that specified in Table 2 below. In Example 2, a cooling rather than a heating bath was needed.

TABLE 2

| Example | Temperature °C. | Final TBP Concentration | % TBP Destroyed |
|---|---|---|---|
| Ex 2 | 30 | 13.66 | 49 |
| Ex 3 | 50 | 4.10 | 85 |
| Ex 4 | 70 | 0.48 | 98 |

From Table 2, it can be seen that the rate and hence extent of destruction of TBP was much greater as the temperature was increased from 30° C. through 50° C. to 70° C., and that the improvement was especially noticeable up to 50° C. Analysis at intermediate times during the addition of the hydrogen peroxide, not recounted here in full, showed that the rate of TBP destruction at 30° and 50° C. respectively was approximately constant and that at 70° C. a similar picture was seen until about 85% of the TBP had been destroyed, whereupon its rate of destruction progressively slowed. These results also show that the efficiency of utilisation of hydrogen peroxide was best at the highest temperature tested, since the same amount was used in each case. It will furthermore be observed that the invention process, even at 30° C. was more efficient at destroying TBP than the iron or copper catalysed prior art process was at 70° C., 40° C. higher.

EXAMPLES 5 AND 6

EFFECT OF AMOUNT OF CATALYST

In these Examples, the process of Example 4 was repeated exactly, except for the amount of catalyst employed. The results, together with that of Example 4 are summarised in Table 3.

TABLE 3

| Example | Catalyst Amount (g) | Final TBP Concentration | % TBP Destroyed |
|---|---|---|---|
| Ex 4 | 0.42 | 0.48 | 98 |
| Ex 5 | 0.84 | 0.23 | 99 |
| Ex 6 | 0.21 | 0.80 | 97 |

From Table 3, it can be seen that the amount of catalyst present had a little effect on the extent of TBP destruction and the extent of efficiency of use of the hydrogen peroxide, but that the extent of the effect was markedly less than the effects previously noted of pH control and temperature variation. Both doubling and halving the catalyst concentration still resulted in excellent TBP destruction in the treatment period.

EXAMPLES 7 AND 8

EFFECT OF CHANGING PEROXIDE ADDITION RATE

In these Examples, the process of Example 4 was followed exactly, except that the period of addition of the hydrogen peroxide was increased by respectively 50% and 100%. the results are summarised in Table 4 with Example 4. In this and subsequent Tables, the abbreviations ND and QD indicate respectively that no alkyl phosphate was detected and that quantitative destruction of the alkyl phosphate had occured, i.e. any residual amount was less than the minimum that the equipment was able to detect.

TABLE 4

| Example | $H_2O_2$ addition time (hours) | Final TBP Concentration | % TBP Destroyed |
|---|---|---|---|
| Ex 4 | 3 | 0.48 | 98 |
| Ex 7 | 4.5 | ND | QD |
| Ex 8 | 6.0 | 0.24 | 99 |

From Table 4, it can be seen that an excellent result was achieved with a peroxide addition period of 3 hours and that even better TBP destruction viz quantitative or very nearly quantitative destruction was obtained when the period for introducing the hydrogen peroxide was increased to about 4.5 hours or longer. Though not apparent from the simple final amount figures listed in Table 4, the intermediate analysis results (not shown) indicated that the efficiency of utilisation of hydrogen peroxide for TBP destruction improved as the rate of addition of peroxide was decreased, at least as regards the destruction of the first 90% or so of the TBP. Thus, for example if a destruction of 97/98% of the TBP was acceptable, and quantitative destruction not needed, it could be achieved with rather less peroxide at the 6 hour addition rate than at either the 4.5 or 3 hour addition rate, namely about 480 g compared with about 590 g and 660 g respectively.

These results accordingly suggest an advantageous variation in which the peroxide is added at the 6 hour rate for destruction of most of the TBP, say 85 to 90% which would employ about 70–75% of the total amount of peroxide in the standard process according to Example 4, and thereafter adding a further 10 to 15% of peroxide at a slower rate of addition still, such as at an 8 or 10 hour rate, thereby achieving a similar destruction to Example 7, but at a lower peroxide consumption.

EXAMPLES 9 AND 10

EFFECT OF VARYING PEROXIDE CONCENTRATION

In these Examples, the process of Example 7 was followed, except that in Example 9 only 550 g of 27% w/w $H_2O_2$ solution was added over 4.5 hours and in Example 10, 300 g of 50% w/w $H_2O_2$ solution was introduced during the same period. The results are summarised in Table 5.

TABLE 5

| Example | $H_2O_2$ strength | Final TBP Concentration | % TBP Destroyed |
|---|---|---|---|
| Ex 9 | 27% | ND | QD |
| Ex 10 | 50% | 0.22 | 99 |

From Table 5, it can be seen that there was very little difference between the two processes, and this is confirmed by the intermediate analyses. This shows, therefore that the actual strength of peroxide employed is not of great importance in the range 27 to 50% w/w.

EXAMPLES 11 TO 16

VARIATION IN REACTION pH

In these Examples, the process of Example 10 was followed, i.e. the general process employed in Example 1, but adding 300 g of 50% w/w $H_2O_2$ solution during a period of 4.5 hours, and in Examples 11 to 14 the pH of the solution was initially at about pH 8.5 and shortly after introduction of hydrogen peroxide commenced, it fell to the pH specified in Table 6 below, and was thereafter maintained at that pH, +/− 0.1 pH units by the introduction, as and when required, of NaOH solution, 2M. In Example 15, Example 14 was repeated but with a modification in that the pH of the mixture was reduced to pH 7 with phosphoric acid before addition of hydrogen peroxide commenced. In Example 16, the pH was regulated by the addition of disodium hydrogen phosphate (9g) before peroxide addition commenced, and no further alkali was added subsequently. The actual pH fell from pH 9.15 to pH 6.30 during the course of the reaction, reaching pH 7.5 after about 45 minutes and this appears as buf in the Table. The results are summarised below.

TABLE 6

| Example | Reaction pH | Final TBP Concentration | % TBP Destroyed |
|---|---|---|---|
| Ex 11 | 6.1 | 6.5 | 76 |
| Ex 12 | 6.8 | ND | QD |
| Ex 13 | 7.6 | 7.30 | 73 |
| Ex 14 | 7.0 | 0.22 | 99 |
| Ex 15 | 7.0 | ND | QD |
| Ex 16 | buf | 2.03 | 92 |

From Table 6, it can be seen that the actual pH at which the mixture is controlled is of substantial importance in obtaining excellent destruction of the TBP. The best result was obtained at a pH just below pH 7, and fell away quite rapidly as the pH was controlled at points further away from the optimum pH range of near pH 7. Correspondingly, though not directly extractable from Table 6, the efficiency of utilisation of peroxide was best at just below pH 7 too. The technique of adjusting the pH of the mixture to the optimum pH at the outset of the reaction, as in Example 15, rather than starting somewhat higher at about pH 8.5 and itting it to drift towards the optimum pH, as in all the ples up to Example 14 showed a small gain in operational ciency. Additionally, Example 16 shows that it is not ssary to add alkali throughout the reaction period, ided that a buffer is present which maintains the pH in range of 6.5 to 7.5 during a substantial proportion of reaction period.

EXAMPLE 17

EFFECT OF HIGHER CONCENTRATION OF TBP

In this Example, the process of Example 15 was followed, but employing a solution of 27% vol/vol TBP in OK instead of a 27% w/w solution. The amount of peroxide (50% w/w) was increased to 369 g and the addition period lengthened correspondingly to 5 hours. The pH of the mixture was kept at pH 6.65, +/− 0.15 pH units. Quantitative destruction of the TBP was achieved, showing that the process was just as effective for even stronger concentrations of TBP than had been tested in preceding Examples.

EXAMPLES 18 AND 19

EFFECT OF LARGER AQUEOUS PHASE

In these Examples, the general method was followed, but modified as required to provide the following reaction conditions. The volumes of the organic phase (27% v/v TBP in kerosene) and water (demineralised) were respectively 35 mls and 475 mls. The amount of $K_2CrO_4$ catalyst present was 0.294 g and the hydrogen peroxide solution introduced gradually over a period of 6 hours in total amounts of respectively 182 g of 70% w/w solution in Ex. 18 and 254 g of 50% w/w solution in Ex 19. The final sample for analysis was taken 1 hour after all the hydrogen peroxide had been introduced. The pH was adjusted to below pH 7 by the introduction of phosphoric acid before peroxide addition commenced, and thereafter was maintained at about pH 6.7, +/− 0.2 pH units with 2N NaOH solution. In both Examples, quantitative destruction of the alkyl phosphate was obtained. The same results were obtained in repetitions of these Examples. It can therefore be deduced from these Examples that it is practicable to employ a very large aqueous component, which naturally renders it easier to cool the reaction medium quickly and effectively.

EXAMPLES 20 TO 22

EFFECT OF RECYCLE OF THE AQUEOUS PHASE

In these Examples, the method as modified in Example 18 was followed, but instead of the aqueous phase comprising initially fresh mineralised water, it comprised 475 mls of the aqueous phase separated from a previous TBP destruction reaction, obtained respectively from Examples 18, 20 and 21 for use in 20, 21 and 22.

In all three Examples, quantitative destruction of the alkyl phosphate occured, which demonstrates that the overall consumption of water in the process can be minimised by at least a partial recycle of the aqueous phase.

EXAMPLES 23 AND 24

EFFECT IN IRRADIATED PLANT MATERIAL

In Example 23, the general method adopted in Example 17 was followed, with the principal exception that the sample of TBP treated was a sample, 50 mls, of radioactive solvent containing 27% v/v TBP in odourless kerosene that had been recovered from a working nuclear fuel reprocessing plant operated by British Nuclear Fuels plc. In this trial, the hydrogen peroxide solution, 50% w/w, 352 g, was introduced over a period of 6 hours in the presence of 0.49 g $K_2CrO_4$ and the pH was maintained between pH 6.5 and pH 7.0. The residual TBP concentration was only 0.25% and the proportion of TBP destroyed was 99.5%. Analysis of the residual aqueous and hydrocarbon phases revealed that over 99% of the initial alpha and ruthenium-106 activity was transferred to the aqueous phase. When this Example was repeated, some variations in the measured extent of radioactive transfer were observed, but normally greater than 95% transfer was observed.

In Example 24, the general method employed in Example 18 was adopted, but employing a second 50 mls sample of the above-mentioned radioactive solvent/TBP mixture in the presence of 675 mls of an aqueous phase recovered from a previous TBP destruction. The amount of catalyst was 0.42g $K_2CrO_4$ and the pH maintained at between pH 6.5 and 7.0. The residual TBP concentration was 0.37% corresponding to destruction of over 99% of the TBP. Radioactivity measurements indicated that over 99% of the radioactivity, both alpha and ruthenium-106, had been transferred to the aqueous phase.

These trials show that the invention procedure retains its activity, despite the presence of radioactive species and that it achieves a previously stated objective of transferring the radioactivity to the aqueous phase from the non-aqueous phase. The presence of a significant and substantial volume of hydrocarbon phase at the end of the period in which TBP has been nearly completely or quantitatively destroyed in these trials, in common with the preceding Examples confirm also that invention procedure destroys the TBP selectively.

EXAMPLE 25

OPERATION AT REFLUX TEMPERATURE

This Example was conducted generally in accordance with the trial described in preceding Example 17, employing a further 50 mls sample of the irradiated 27% v/v TBP/OK solution employed in Examples 23 and 24. The specific conditions were that the hydrogen peroxide solution, 356 g, 50% w/w, was added gradually during a period of 4.5 hours, the amount of potassium chromate catalyst present was 0.42 g and the pH of the aqueous phase was taken to and kept at about pH 6.5 to pH 7.0. The process was conducted at the reflux temperature of the reaction mixture, which was a little over 100° C., the maximum being about 105° C. The residual TBP concentration was only 0.22%, so that in excess of 99% of the TBP had been destroyed. In addition, in excess of 99% of the alpha activity and 95% of the ruthenium-106 activity had also been transferred to the aqueous phase.

From this Example, it can be seen not only that the invention process can effectively destroy the alkyl phosphate at the reflux temperature of the liquor and in consequence transfer the radioactivity to the aqueous phase, it, moreover, can do so whilst simultaneuously not destroying the bulk of the kerosene, thereby establishing the selective nature of the invention system under the most stringent operating conditions in which oxidation of the kerosene was most likely to occur.

EXAMPLE 26

REFLUX TEMPERATURE AND CONSTANT VOLUME

In this Example, the procedure of Example 25 was followed, employing a further 50 mls sample of irradiated 27% v/v TBP/OK solution, pH 6.5 to 7, 0.42 g potassium chromate catalyst, reflux temperature (slightly above 100° C., maximum 105° C.) and 352 g 50% w/w hydrogen peroxide solution introduced gradually through a period of 5.5 hours. The principal difference of this Example compared with Example 25 was that the condenser for the refluxed water vapour was so arranged that part of the condensate was collected in a separate vessel from the reaction vessel, the fraction being so adjusted by hand that the volume of aqueous phase in the reaction mixture remained substantially constant during the reaction period.

At the end of the reaction period the residual concentration of TBP was 0.34%, which showed that over 98% of the TBP had been destroyed. In addition, radioactivity measurements on the organic and aqueous phases showed that in excess of 99% of the alpha activity and 90% of the ruthenium 106 activity had been transferred to the aqueous phase.

This Example demonstrates that the benefits from using the invention catalyst system under selected pH conditions can be married successfully with the engineering benefits obtainable from a constant volume reaction mixture, when the process is operated at its reflux temperature.

EXAMPLE 27

CONSTANT VOLUME AND REDUCED PEROXIDE ADDITION

In this Example, the procedure, quantities and conditions employed were the same as in Example 26, except that organic phase had not been subjected to irradiation and the total amount of hydrogen peroxide solution introduced was only 177 g of 50% w/w solution that was introduced over a 7 hour period. Despite the relatively small amount of hydrogen peroxide added, the residual level of TBP was only 0.6% approx, which converts to over 95% TBP destruction.

This Example shows that under the conditions of the reflux temperature/constant volume operation, very efficient use can be made of the hydrogen peroxide.

EXAMPLE 28

CONSTANT VOLUME—LOWER pH

In this Example, a similar process to that of Example 26 was followed, i.e. operation with a substantially constant volume of aqueous phase (100 mls) in contact with the organic phase of 50 mls (27% v/v TBP/OK), and at reflux temperature. The hydrogen peroxide solution was introduced over a period of 300 minutes to a total of 257.5 g (49.32% w/w solution). The significant difference from Example 26 was that the pH of the reaction mixture was maintained at pH 5.0. The aqueous phase was periodically sampled and analysed for active oxygen which is expressed as $H_2O_2$. This drifted slowly from a level of 0.16% w/w after 30 minutes down to 0.08% after 120 minutes and fluctuated between that level and 0.13% during the succeeding 150 minutes. At the end of the reaction period the residual TBP level was 0.43%, having fallen from an initial level of 31.28%, thereby confirming that over 98% of the TBP had been destroyed.

From this Example, it can seen that not only is the process more tolerant of a lower pH under the conditions employed (reflux temperature, constant volume operation), but the gradual introduction of peroxide leads to a low and quite constant level of peroxide remaining in the aqueous phase, i.e. an unsafe build-up of peroxide is avoided.

COMPARISONS CJ TO CL AND EXAMPLE 29

These Comparisons and Examples were carried using the reflux temperature and constant volume conditions described in Example 26, on further 50 mls samples of 27% v/v TBP/OK. Hydrogen peroxide solution, 49.3% w/w, was metered into the reaction vessel with a peristaltic pump at approximately the same rate in each trial, about 51 to 52 g solution per hour (i.e. about 0.85 g per minute), the rate which in preceding Examples was shown to be sufficient to destroy over 99% of the TBP after 5 hours using the invention combination of catalyst and pH control. The residual concentration of hydrogen peroxide in the aqueous phase was measured at intervals, as also was the content of TBP. The difference between them resided in the selection of catalyst conditions, as summarised in Table 7 below. In Comparisons CJ to CL the mixture was permitted to attain its natural pH (about 1.8 initially) and in Example 29, the solution was maintained at between pH 6.5 and 7.0. In the Table, Fe* represents ferric nitrate, $Fe(NO_3)_3.9H_2O$ and Cr* the potassium chromate catalyst employed in many of the preceding Examples.

TABLE 7

| Comp/ | Catalyst | | % peroxide conc | | % TBP destruction | |
|---|---|---|---|---|---|---|
| Ex No | Metal | Amount | 1 hour | 2 hours | 1 hour | 2 hours |
| CJ | CuO | 0.17 g | | 6.8% | 10.6% | 22.8% |
| CK | CuO | 1.0 g | | 5.5% | 12.8% | 26.9% |
| CL | Fe* | 0.87 g | 4.7% | 5.1% | 33.7% | 36.9% |
| Ex 32 | Cr* | 0.42 g | 0.15% | 0.08% | 24.6% | 58.0% |

The runs in Comparisons CJ to CL were each halted after 2 hours for either or both of the following reasons. Firstly, the concentration of hydrogen peroxide in the aqueous phase had increased to unacceptably high levels which rendered the process much less safe to operate. Secondly, despite the high residual concentration of hydrogen peroxide in solution , the extent of TBP destruction had slowed down very markedly using the iron catalyst, so that it was apparent that the final extent of TBP destruction would be little more than the extent already attained. Although copper was continuing to catalyse the TBP destruction after 2 hours, the rate was very much slower than using the chromium catalst system.

It can be seen from Table 7 that the invention catalyst system was continuing to catalyse the destruction of TBP at a similar or faster rate after 2 hours to that after 1 hour and that it was also keeping the concentration of hydrogen peroxide at the advantageously low levels of well below 1% w/w in the aqueous phase. Accordingly, it can be deduced from the data in Table 7 that under the conditions of the tests, the prior art copper and iron catalysts were significantly inferior to the invention catalyst system.

WE CLAIM:

1. In a process for decomposing an alkylphosphate in which the alkyl-phosphate by itself or dissolved in a hydrophobic organic solvent is reacted with hydrogen peroxide in aqueous solution added progressively at a temperature that is above ambient temperature and in the presence of a transition metal catalyst, the improvement in which the catalyst comprises an effective amount of a chromium compound and the aqueous hydrogen peroxide phase is maintained in a pH window range of mildly acidic to mildly alkaline pH by the controlled introduction of alkali at a rate that is sufficient to neutralise the acid released by decomposition of the alkylphosphate, or is buffered by the presence of an alkali buffer to within the said pH range, thereby significantly accelerating the rate of decomposition of the alkylphosphate.

2. A process according to claim 1 in which the aqueous phase is maintained at a pH not exceding pH 9.0.

3. A process according to claim 1 in which the reaction is carried out at a temperature in the range of 60° C. to the boiling point of the aqueous phase.

4. A process according to claim 3 in which the reaction is carried out at a temperature in the range of 60° to 75° C.

5. A process according to claim 4 in which the reaction is carried out at a pH in the range of pH 6 to 9.

6. A process according to claim 3 in which the reaction is carried out at a temperature within 5° C. of the boiling point of the aqueous phase.

7. A process according to claim 6 in which the reaction is carried out at a pH of at least pH 5.

8. A process according to claim 1 in which the aqueous phase is maintained at a pH which is at least 0.5 pH units higher than the lower limit of the window range for pH at the temperature of operation.

9. A process according to claim 8 in which the aqueous phase is maintained at a pH in the range of pH 6.5 to 7.5.

10. A process according to claim 1 in which the aqueous phase is adjusted to the desired pH range before addition of hydrogen peroxide commences.

11. A process according to claim 1 in which the desired pH of the aqueous phase is maintained by introduction of aqueous alkali metal hydroxide solution, preferably sodium hydroxide.

12. A process according .to claim 11 in which the desired pH of the aqueous phase is maintained by introduction of aqueous sodium hydroxide solution.

13. A process according to claim 1 in which the desired pH of the aqueous phase is maintained for at least part of the time by the presence of an alkali metal phosphate which acts as a pH buffer.

14. A process according to claim 1 in which the amount of catalyst employed, calculated on the basis of its chromium content, is selected within the range of 0.05 to 8 parts w/w per 100 parts by weight of alkyl phosphate.

15. A process according to claim 14 in which the amount of catalyst employed, calculated on the basis of its chromium content, is selected within the range of 0.25 to 2 parts w/w per 100 parts by weight of alkyl phosphate.

16. A process according to claim 1 in which the catalyst is introduced as an alkali metal chromate.

17. A process according to claim 1 in which the amount of hydrogen peroxide introduced is selected in a range which varies in accordance with the reaction temperature employed, the range comprising from 60 to 150 moles per mole of alkyl phosphate at a reaction temperature of up to 75° C. and varying to that of from 50 to 100 moles per mole of alkyl phosphate at a reaction temperature within 5° C. of the boiling point of the aqueous phase.

18. A process according to claim 1 in which the hydrogen peroxide solution is introduced during a period of from 3 to 10 hours.

19. A process according to claim 1 in which the hydrogen peroxide solution is introduced at such a rate that its residual concentration in the aqueous phase does not exceed 1.0% w/w.

20. A process according to claim 17 in which the hydrogen peroxide solution is introduced during a period of from 3 to 10 hours and at such a rate that its residual concentration in the aqueous phase does not exceed 1.0% w/w.

21. A process according to claim 1 in which the hydrogen peroxide solution is introduced progressively until analysis of the organic phase indicates that substantially quantitative destruction of the alkyl phosphate has been obtained.

22. A process according to claim 1 in which the concentration of the hydrogen peroxide solution introduced is selected in the range of from 35 to 70% w/w.

23. A process according to claim 17 in which the reaction is carried out at a pH which is selected in a range which varies in accordance with the reaction temperature, the range comprising pH 6 to 9 at a reaction temperature of from 60° to 75° C. and varying to a pH range of pH 5 to 7.5 as the reaction temperature is varied to within 5° of the boiling point of the aqueous phase, the pH being maintained by the introduction of an alkali solution and partly by the presence of an alkali metal phosphate buffer during at least part of the reaction period, and which employs an alkali metal chromate as catalyst in an amount calculated on the basis of its chromium content, of from 0.05 to 8 parts w/w per 100 parts by weight of alkyl phosphate.

24. A process according to claim 1 in which the reaction mixture contains at least an equal volume of aqueous phase in addition to the organic phase containing the alkylphosphate at the start of addition of the aqueous hydrogen peroxide solution.

25. A process according to claim 1 in which at least part of the aqueous phase remaining at the end of the reaction is separated from the treated organic phase and subsequently contacted with a further amount of non-treated organic phase containing alkylphosphate for destruction with hydrogen peroxide.

26. A process according to claim 24 in which the volume of the aqueous phase is maintained approximately constant during the reaction period by balancing the rate of introduction of aqueous hydrogen peroxide solution with the net rate at which water is evapourated and removed from the reaction mixture.

27. A process according to claim 1 in which the alkyl phosphate to be destroyed is present as a solution of at least 20% v/v and particularly from 20% to 50% v/v in a high boiling point hydrocarbon solvent.

28. A process according to claim 1 in which the alkyl phosphate is a trialkyl phosphate.

29. A process according to claim 1 in which the alkyl moiety in the alkyl phosphate contains from 2 to 8 carbon atoms.

30. A process according to claim 29 in which the alkyl moiety is butyl.

31. A process according to claim 29 in which the alkyl phosphate is tributyl phosphate.

32. A process according to claim 1 in which the hydrocarbon solvent is odourless kerosene.

33. A process according to claim 17 or 23 in which the alkyl phosphate comprises a butyl phosphate, optionally dissolved in odourless kerosene.

34. A process according to claim 1 or 32 in which the organic phase contains radioactive species from contact with nuclear waste and the process is continued until at least 90% of the radioactivity has been transferred to the aqueous phase.

* * * * *